UNITED STATES PATENT OFFICE.

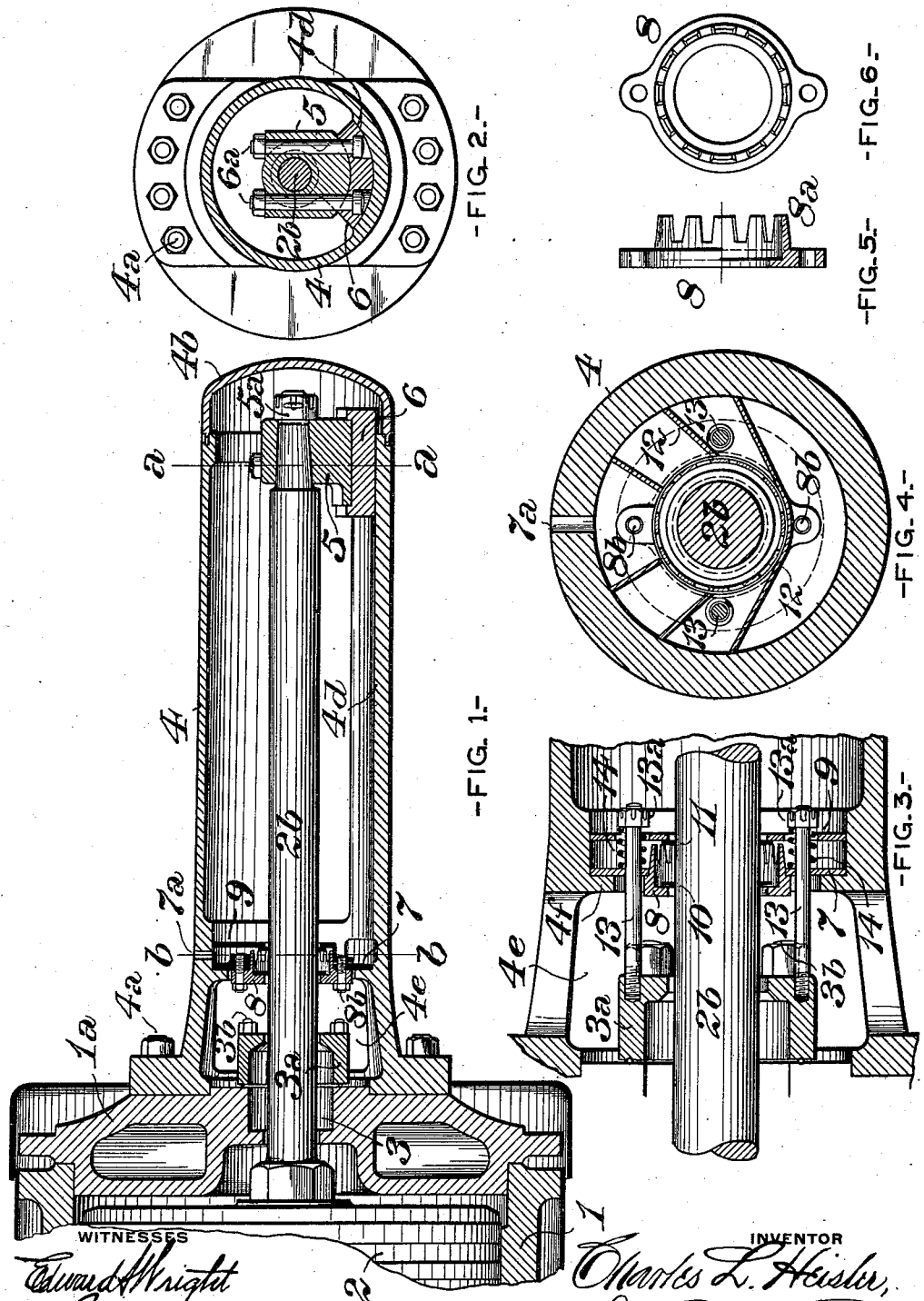

CHARLES L. HEISLER, OF SCHENECTADY, NEW YORK.

PISTON-ROD-EXTENSION GUIDE.

1,019,150. Specification of Letters Patent. Patented Mar. 5, 1912.

Application filed December 20, 1911. Serial No. 666,903.

*To all whom it may concern:*

Be it known that I, CHARLES L. HEISLER, of Schenectady, in the county of Schenectady and State of New York, have invented a certain new and useful Improvement in Piston-Rod-Extension Guides, of which improvement the following is a specification.

My invention relates to guides for supporting a forward extension of the piston rod of a locomotive or other steam engine, and its object is to provide an appliance of such type in which constant and effective lubrication of the contact surfaces of the fixed and moving members may be maintained, the access of dust and other foreign matter thereto be fully prevented, and the piston rod stuffing box be rendered readily and conveniently accessible for repacking, as from time to time is necessary or desirable.

The improvement claimed is hereinafter fully set forth.

In the accompanying drawings: Figure 1 is a vertical longitudinal central section through the forward portion of a steam engine cylinder, its head, and the extension piston rod guide, illustrating an application of my invention; Fig. 2, a vertical transverse section, on the line $a\ a$ of Fig. 1; Fig. 3, a partial horizontal central section; Fig. 4, a vertical transverse section on the line $b\ b$ of Fig. 1; Fig. 5, a side view, in elevation, of the piston rod swab box gland; and, Fig. 6, a front view of the same.

My invention is herein exemplified as applied in connection with a steam engine cylinder, 1, which is closed at its front end by a head, $1^a$, and is fitted with a suitable piston, 2, secured upon a piston rod having a forward extension, $2^b$, which passes through the cylinder head, $1^a$, a steam tight joint of the extension therewith being formed by a properly packed stuffing box, 3, closed by a gland or cap, $3^a$, which is removably secured to the cylinder head by bolts or studs, $3^b$.

In the practice of my invention, I provide an oil chamber, 4, which is of cylindrical form and of such length as to inclose the extension piston rod throughout the entire range of its stroke. The rear end of the oil chamber, which is open, is finished, and is bored out concentrically with the cylinder, and fits truly around a short cylindrical projection, also concentric with the cylinder, on the outer side of the cylinder head, $1^a$, to which it is secured by bolts, $4^a$. The forward end of the oil chamber is closed by a head or cap, $4^b$, which is secured in position by bolts. A guide face, $4^d$, which is finished concentrically with the extension piston rod, is formed on the lower inside portion of the oil chamber, and a shoe or slipper, 5, is secured to the extension piston rod, near its outer end, by a nut, $5^a$, engaging a thread on the rod, said shoe having a bearing block, 6, the lower face of which is curved correspondingly with the guide face, $4^d$, secured to it by bolts, $6^a$.

Openings, $4^e$, are formed in the wall of the oil chamber, adjoining its rear end, providing an accessible space or packing adjusting chamber within it, extending for a sufficient distance from its rear end to enable free access to be had to the stuffing box gland, $3^a$, and its bolts, $3^b$. Said space, the openings into which may, if desired, be closed by removable cover plates, is cut off from communication with the main body of the oil chamber, which constitutes a closed oil retaining receptacle, by means for effecting the supply of oil to the extension piston rod and to said oil receptacle, of substantially the following construction.

An annular flange, $4^f$, is formed on the inside of the oil chamber, 4, at the front end of the open portion thereof, which adjoins the cylinder head, and a swab box, comprising a rear wall, 7, and a connected front wall, 9, is fitted against the front of said flange. A cylindrical swab box gland, 8, having a plurality of notches or recesses, $8^a$, on its forward side, to facilitate the soaking of a swab with oil, is fitted freely around the extension piston rod, and, peripherally, fits truly in the rear wall, 7, of the swab box, to which it is secured by bolts or studs, $8^b$. An oil supply opening, $7^a$, which may be closed by a removable plug, or otherwise suitably protected, is formed in the top of the oil chamber, leading into the space between the walls, 7, and 9, of the swab box. Washers, 10 and 11, are preferably fitted around the extension piston rod, adjoining the walls, 7, and 9, of the swab box, respectively, to prevent leakage of oil through the openings of said plates, and wings, 12, extend across the swab box, between the swab box gland and the wall of the oil chamber, to collect oil which is splashed against the front wall, 9, by the movements of the shoe.

The swab box is connected to the stuffing box gland, 3ª, by studs, 13, which pass freely through the walls of the swab box, and are provided with nuts, 13ª, on the forward side of the front wall, 9, thereof. Springs, 14, are interposed between the nuts, 13ª, and the rear wall, 7, their purpose being to compensate imperfection in workmanship and maintain a tight bearing of the swab box against the annular flange, 4ᶠ. When it is desired to repack the swab box gland, 8, the nuts of the studs, 8ᵇ, are loosened, and the swab box gland is drawn back into the open space at its rear side. In order to repack the piston rod stuffing box, it is only necessary to remove the nuts of the bolts, 3ᵇ, which can be done through the side openings into the open space at the rear end of the oil chamber, and slide the gland, with the swab box, along the extension piston rod, as far outwardly as may be necessary.

It will be seen that under the construction above described, the extension piston rod and its shoe and guide are completely inclosed in a receptacle which is oil tight, and water, steam, dust, and snow proof. An open chamber is also interposed between the oil receptacle and the hot cylinder, preventing loss of oil by leakage, and deterioration by the heat of the cylinder head, as also preventing mixture of the oil with water or steam from a possibly leaky stuffing box, which, in cold weather, would cause an accumulation of ice in the oil chamber, and if superheated steam is used, such leakage would destroy the oil in the oil chamber. The facility with which the stuffing box may be repacked will be obvious, and by reason of the perfect lubrication and exemption from access of dust and other foreign matter, the appliance may be operated with a minimum of attention, oil, and cost of maintenance.

I claim as my invention, and desire to secure by Letters Patent:—

1. In a steam engine, the combination of a cylinder head, and an oil chamber secured thereto, said oil chamber having a closed oil receptacle extending rearwardly from its front end and inclosing a piston rod guide face, and having an accessible chamber at and adjoining its rear end.

2. In a steam engine, the combination of a cylinder head, an oil chamber secured thereto and having an oil receptacle extending rearwardly from its front end, and inclosing a piston rod guide face, a removable cap closing the front end of said oil receptacle, and a swab box perforated for the passage of a piston rod and closing the rear end of said oil receptacle.

3. In a steam engine, the combination of a cylinder head, an oil chamber secured thereto and having a piston rod guide face extending rearwardly from its front end, and an accessible space between said guide and the cylinder head, a swab box closing the oil chamber at the front of said space, and an extension piston rod oiling swab box gland secured in said swab box.

4. In a steam engine, the combination of a cylinder head, a stuffing box gland secured thereto, an oil chamber secured thereto around said gland and having an oil receptacle extending rearwardly from its front end and inclosing an extension piston rod guide face, and an accessible space between said oil receptacle and the cylinder head, a swab box closing the oil chamber at the front of said space, means for supplying oil to the swab box, and means for connecting the swab box with the cylinder head stuffing box gland.

5. In a steam engine, the combination of a cylinder head, an oil chamber secured thereto and having an oil receptacle extending rearwardly from its front end and inclosing a piston rod guide face, and an accessible space between said guide face and the cylinder head, a swab box closing the oil chamber at the front of said space, an extension piston rod oiling swab box gland secured to the swab box, and oil collecting wings in the swab box, extending between its central portion and the wall of the oil chamber.

6. In a steam engine, the combination of a cylinder head, a stuffing box gland secured thereto, an oil chamber secured thereto around said gland and having an oil receptacle extending rearwardly from its front end and inclosing a piston rod guide face, and an accessible space around said gland, a swab box closing the oil chamber at the front of said space, bolts engaging the stuffing box gland, and springs interposed between nuts on said bolts and the swab box.

CHARLES L. HEISLER.

Witnesses:
CHAS. H. PARSONS,
A. LARMON ENGLISH.

Copies of this patent may be obtained for five cents each, by addressing the "Commissioner of Patents, Washington, D. C."